US009628659B2

United States Patent
Kim et al.

(10) Patent No.: US 9,628,659 B2
(45) Date of Patent: Apr. 18, 2017

(54) METHOD AND APPARATUS FOR INSPECTING AN OBJECT EMPLOYING MACHINE VISION

(71) Applicants: GM GLOBAL TECHNOLOGY OPERATIONS LLC, Detroit, MI (US); SungKyunKwan University Foundation for Corporate Collaboration, Gyeonggi-Do (KR)

(72) Inventors: Jaewoong Kim, Seoul (KR); Sukhan Lee, Gyeonggi-Do (KR); Jianying Shi, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 281 days.

(21) Appl. No.: 14/592,135

(22) Filed: Jan. 8, 2015

(65) Prior Publication Data
US 2016/0205283 A1      Jul. 14, 2016

(51) Int. Cl.
| | |
|---|---|
| *G06K 9/00* | (2006.01) |
| *H04N 1/21* | (2006.01) |
| *G06K 9/46* | (2006.01) |
| *G06K 9/52* | (2006.01) |
| *G06K 9/62* | (2006.01) |
| *G06T 7/00* | (2017.01) |

(52) U.S. Cl.
CPC ......... *H04N 1/2129* (2013.01); *G06K 9/4604* (2013.01); *G06K 9/4661* (2013.01); *G06K 9/52* (2013.01); *G06K 9/6218* (2013.01); *G06T 7/0004* (2013.01); *G06T 7/0085* (2013.01); *G06T 2207/20136* (2013.01)

(58) Field of Classification Search
None
See application file for complete search history.

(56) References Cited

U.S. PATENT DOCUMENTS

| | | | |
|---|---|---|---|
| 6,697,497 B1 * | 2/2004 | Jensen ................. | G06T 7/0083 382/100 |
| 2007/0115464 A1 * | 5/2007 | Harding ............... | G01N 21/958 356/239.2 |

(Continued)

OTHER PUBLICATIONS

Nadernejad, Sharifzadeh, and Hassanpour,; "Edge Detection Techniques: Evaluations and Comparisons"; Applied Mathematical Sciences, vol. 2, 2008, No. 31, pp. 1507-1520.

*Primary Examiner* — Vikkram Bali
(74) *Attorney, Agent, or Firm* — Quinn IP Law

(57) ABSTRACT

A machine vision system including a digital camera can be employed to inspect an object in a field of view, including capturing an original digital image including a multiplicity of pixels and associated light intensities for the field of view including the object. A bitmap image file is generated, and a mean value and a standard deviation of the light intensities of the multiplicity of pixels of the bitmap image file for the original digital image are dynamically determined. New image files are generated, each including a portion of the multiplicity of pixels having associated light intensities within a prescribed range of light intensities defined by the mean value and the standard deviation. Line segments are extracted from each of the new image files, and the extracted line segments from the new image files are merged and clustered to generate integral lines based thereon.

19 Claims, 5 Drawing Sheets

(56) References Cited

U.S. PATENT DOCUMENTS

| | | | |
|---|---|---|---|
| 2013/0057537 A1* | 3/2013 | Hong | G06T 7/0051 345/419 |
| 2013/0266175 A1* | 10/2013 | Zhang | G06T 7/0083 382/103 |
| 2013/0342877 A1 | 12/2013 | Askan | |
| 2015/0227800 A1* | 8/2015 | Takemae | G06T 7/0081 382/104 |

* cited by examiner

METHOD AND APPARATUS FOR INSPECTING AN OBJECT EMPLOYING MACHINE VISION

TECHNICAL FIELD

The present disclosure relates to machine vision systems.

BACKGROUND

Imaging systems are employed in manufacturing environments to automatically inspect stationary components. Imaging systems seek to determine three-dimensional (3D) information about an object in a field of view for quality inspection, reverse engineering, robotics and similar systems. Such systems employ structural lighting as part of a stereo imaging system to project light onto a field of view, capturing digital images of an object in the field of view and employing geometric methodology and decoding techniques to calculate image depth(s) using the digital images.

SUMMARY

A machine vision system including a digital camera can be employed to inspect an object in a field of view. One method for inspecting the object includes capturing, via the digital camera, an original digital image including a multiplicity of pixels and associated light intensities for the field of view including the object. A bitmap image file for the original digital image is generated, including the multiplicity of pixels and associated light intensities for the field of view including the object. A mean value and a standard deviation of the light intensities of the multiplicity of pixels of the bitmap image file for the original digital image are dynamically determined using a controller. New image files are generated, with each new image file including a portion of the multiplicity of pixels having associated light intensities within a prescribed range of light intensities defined by the mean value and the standard deviation. Line segments are extracted from each of the new image files, and the extracted line segments from the new image files are merged and clustered to generate integral lines based thereon.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 3-1 schematically shows an example of a digital image generated from a bitmap image file for an original digital image that is captured of an object in a FOV, in accordance with the disclosure;

FIG. 3-2 shows a new digital image that visually displays a first image file that is derived from the bitmap image file for the original digital image generated for the object shown with reference to FIG. 3-1, in accordance with the disclosure;

FIG. 3-3 shows another new digital image that visually displays a second image file that is derived from the bitmap image file for the original digital image generated for the object shown with reference to FIG. 3-1, in accordance with the disclosure;

FIG. 3-4 shows another new digital image that visually displays a third image file that is derived from the bitmap image file for the original digital image generated for the object shown with reference to FIG. 3-1, in accordance with the disclosure;

FIG. 3-5 shows another new digital image that visually displays a fourth image file that is derived from the bitmap image file for the original digital image generated for the object shown with reference to FIG. 3-1, in accordance with the disclosure;

FIG. 3-6 shows another new digital image that visually displays a fifth image file that is derived from the bitmap image file for the original digital image generated for the object shown with reference to FIG. 3-1, in accordance with the disclosure;

FIG. 3-7 shows the bitmap image file for the original digital image generated for the object shown with reference to FIG. 3-1 that includes a plurality of merged and clustered line segments extracted from each of the images in FIG. 3-2 through 3-6, in accordance with the disclosure;

FIG. 4 graphically shows a first line segment extracted from the image shown with reference to FIG. 3-2 and a second line segment extracted from the image shown with reference to FIG. 3-3 to explain a process step of merging non-intersecting line segments when the line segments are proximal and somewhat parallel, in accordance with the disclosure; and FIG. 5 a third line segment extracted from the image shown with reference to FIG. 3-2 and a fourth line segment extracted from the image shown with reference to FIG. 3-3 to explain a process step of clustering intersecting line segments, in accordance with the disclosure.

DETAILED DESCRIPTION

Figure 1:
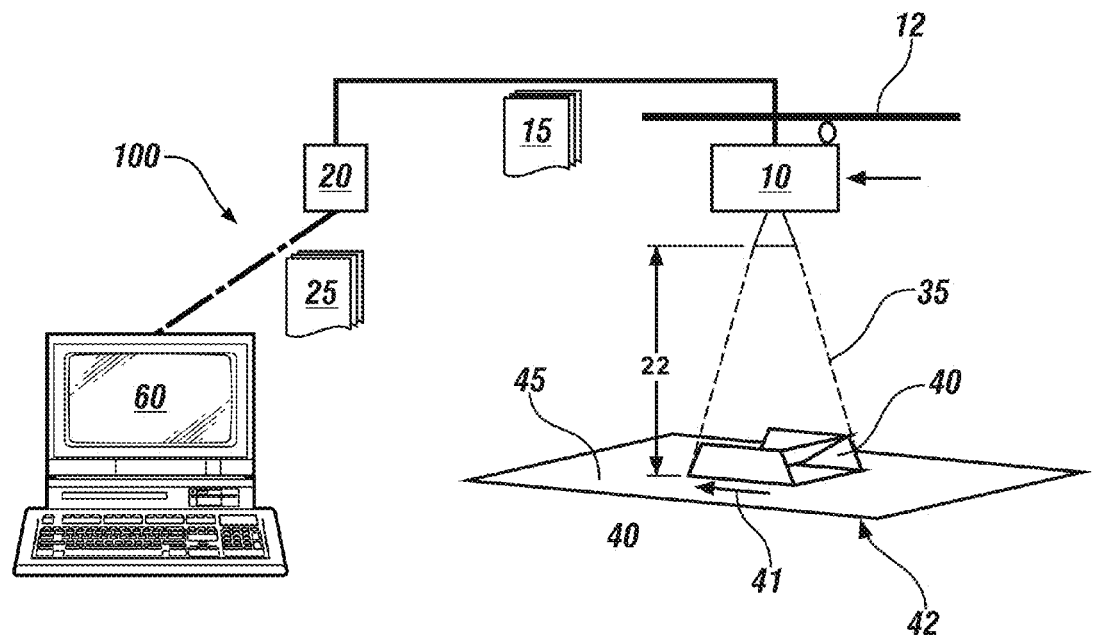
FIG. 1 schematically illustrates an exemplary vision system including an image detector (camera), a camera controller and an analytic controller, in accordance with the disclosure.

Referring now to the drawings, wherein the depictions are for the purpose of illustrating certain exemplary embodiments only and not for the purpose of limiting the same, FIG. 1 schematically illustrates an exemplary vision system 100 including an image recorder (camera) 10 that signally connects to an analytic controller 60.

The camera 10 is preferably a digital image recording device capable of capturing a two-dimensional (2D) image 15 of a field of view (FOV) 35. By way of definition, an image is any visually perceptible depiction representing a field of view. An image may encompass all or a portion of reflected light in the field of view from a visual light spectrum in one embodiment, including a grayscale reflection, a red-green-blue (RGB) reflection, a black-and-white reflection, or any other suitable or desirable reflection. Preferably, an image is captured and recorded in a non-transitory storage medium, such as in a non-transitory digital data storage medium or on photographic film. The camera 10 operates in response to a trigger signal, and opens its shutter for a preset shutter time associated with a preferred exposure time. In one embodiment, the trigger signal may have a pulsewidth of at least 1 us. The camera shutter speed includes a delay time on the order of less than 10 us. The preset shutter time is set for an appropriate exposure time. After the camera 10 closes the shutter, there may be a delay on the order of 1 ms for data capture, after which the data is transferred to the analytic controller 60. The data transfer time to the analytic controller 60 is about 30 ms, and is a fixed magnitude related to the camera model, which has a predetermined image capture and transfer rate (frames per second). Thus, the entire cycle time from start of the trigger to end of data transfer is less than 40 ms in one embodiment.

The camera 10 can be at any position and orientation relative to the FOV 35. In one embodiment, the FOV 35 includes an object 40 oriented on a moveable plane 45 that is at a predetermined distance 22 from the camera 10. The object 40 is a structural entity having features including by way of example spatial dimensions, materials and surface finishes indicating reflectivity, among others. In one embodiment, the object 40 can be a component or area on a vehicle in an assembly plant.

In one embodiment, the object 40 oriented on the moveable plane 45 is mounted on a first conveying system 42 that conveys the object 40 in a linear path 41 at a known rate of speed, and the camera 10 is mounted on a second conveying system 12 that conveys them in a corresponding linear path at the known rate of speed for a fixed distance. The linear path 41 in which the object 40 and the camera 10 are conveyed includes the FOV 35.

In one embodiment, the 2D image 15 is a grayscale image captured by the camera 10 in a bitmap image file including a multiplicity of pixels, wherein each pixel has an 8-bit value representing a grayscale value. The bitmap image file represents the FOV 35. Other embodiments of the 2D image 15 can include a 2D color image represented by Hue-Saturation-Intensity (HSI triplets) or Red, Green, and Blue (RGB) primary colors of the FOV 35 or other image representations without limitation. The camera 10 includes an image acquisition sensor that signally connects to the camera controller 20 that executes digital signal processing (DSP) on the 2D image 15. The image acquisition sensor captures a multiplicity of pixels in the FOV 35 at a predetermined resolution, and the camera controller 20 generates a bitmap image file 25 of the FOV 35, e.g., an 8-bit bitmap of the pixels representing the FOV 35 at a predefined resolution, which is communicated to the analytic controller 60. The bitmap image file 25 is an encoded datafile stored in a non-transitory digital data storage medium in one embodiment. The bitmap image file 25 includes a digital representation of the 2D image 15 that may include one or a plurality of objects 40 and represents an original image of the FOV 35 captured at the original resolution of the camera 10. The image acquisition sensor of the camera 10 captures the 2D image 15 of the FOV 35 as a multiplicity of pixels at a nominally standard-definition resolution, e.g., 640×480 pixels. Alternatively, the image acquisition sensor of the camera 10 may capture the 2D image 15 at a nominally high-definition resolution, e.g., 1440×1024 pixels, or at another suitable resolution. The image acquisition sensor of the camera 10 preferably captures the 2D image 15 in the form of one or a plurality of still images at the predetermined image capture and transfer rate of the camera 10. The 2D image 15 is converted to the bitmap image file 25 for storage and analysis in the analytic controller 60.

Controller, control module, module, control, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality, including data storage and data analysis. Software, firmware, programs, instructions, routines, code, algorithms and similar terms mean any controller-executable instruction sets including calibrations and look-up tables.

Figure 2:
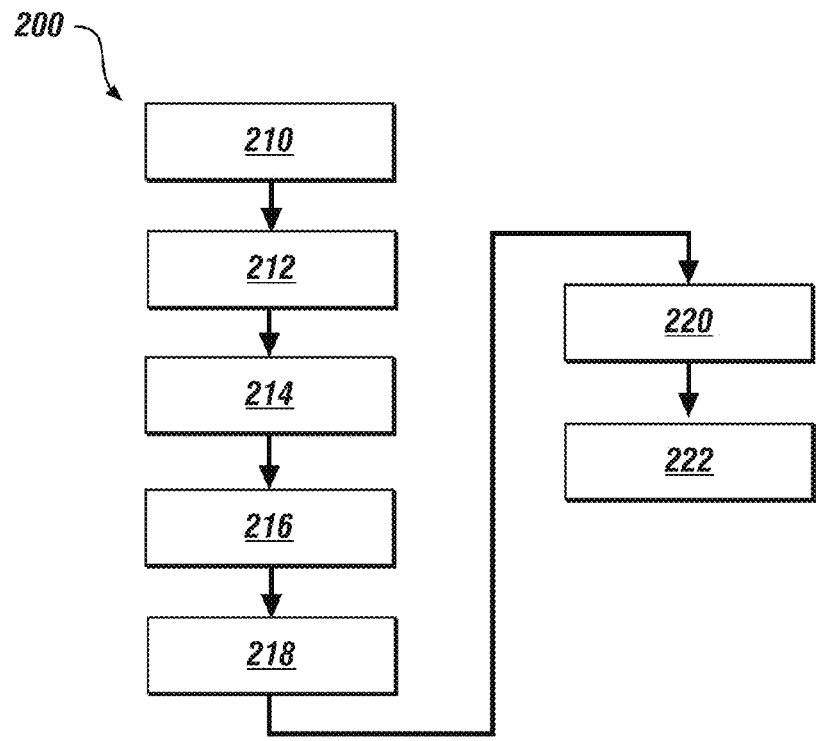
FIG. 2 schematically shows an image feature identification routine for identifying features of an object from images of a field of view (FOV) captured employing an embodiment of the vision system described with reference to FIG. 1, in accordance with the disclosure.

FIG. 2 schematically shows an image feature identification routine 200 for identifying features of an object from images captured employing an embodiment of the vision system 100 described with reference to FIG. 1 that includes an image recorder (camera) 10 signally connected to an analytic controller 60 to capture images of an object 40. Table 1 is provided as a key wherein the numerically labeled blocks and the corresponding functions are set forth as follows, corresponding to the image feature identification routine 200.

TABLE 1

| BLOCK | BLOCK CONTENTS |
|-------|----------------|
| 210 | Capture original digital image of FOV including object |
| 212 | Calculate average light intensity μ and standard deviation α for original digital image |
| 214 | Generate plurality of new image files, each new image file associated with a bin, with BIN(k) = μ + k * x * α, for k = −n through n |
| 216 | Extract line segments in each of the new image files |
| 218 | Merge extracted line segments in the new image files to generate integral lines for the original digital image |
| 220 | Cluster extracted line segments in the new image files to generate integral lines for the original digital image |
| 222 | Export integral lines |

The image feature identification routine 200 executes as follows to identify and digitally extract one or more visibly discernible physical features from an original digital image that includes an object of interest. The image feature identification routine 200 and elements thereof preferably periodically execute to identify features of an object from images captured employing an embodiment of the vision system 100. In one embodiment, the image feature identification routine 200 periodically executes at a rate that is less than 1 second. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figures 1, 3:
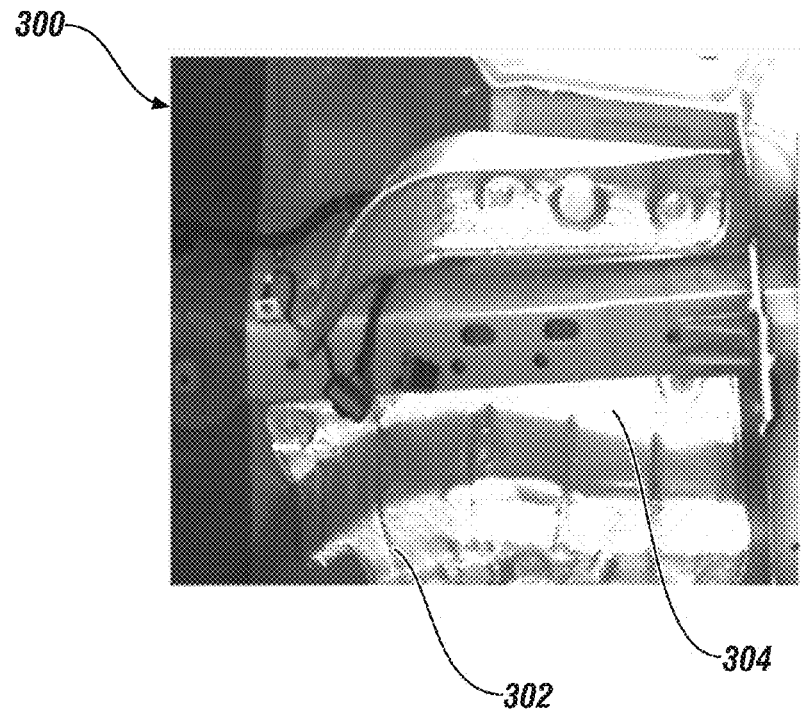
Figures 2, 3:
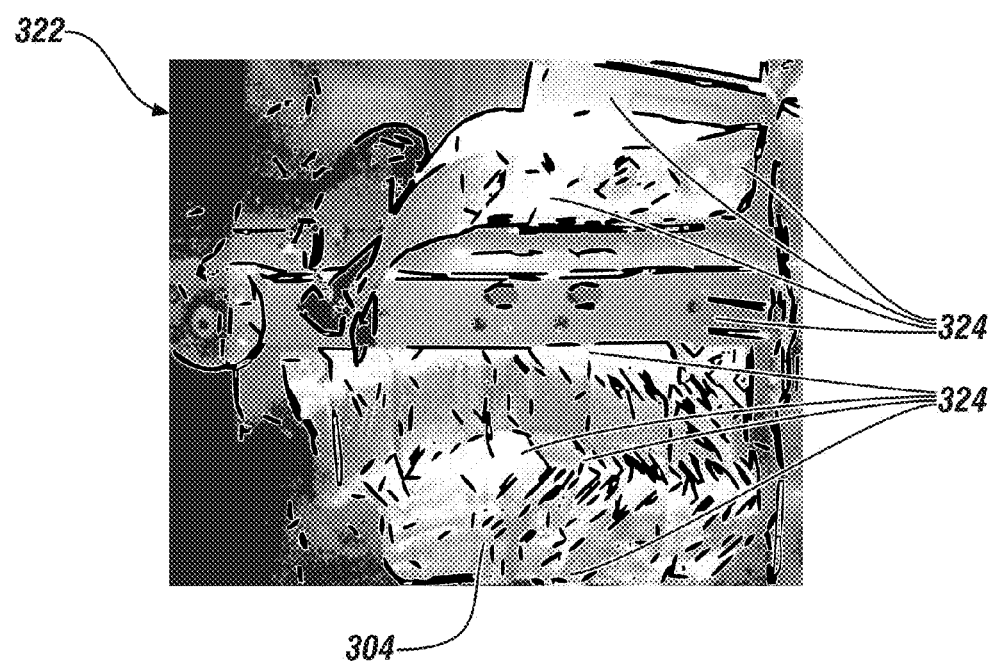
Figure 3:
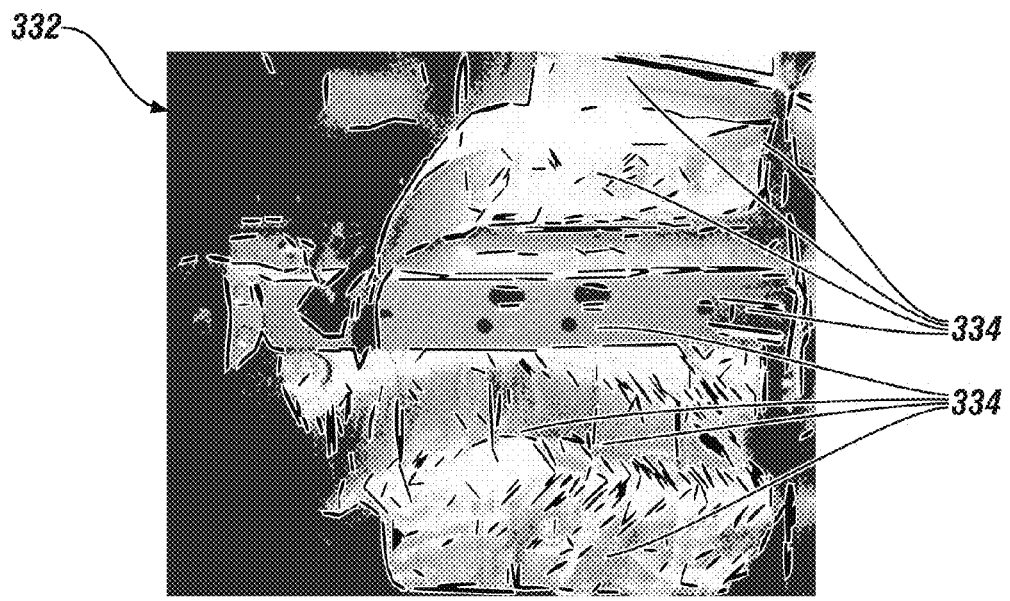

An original digital image of the FOV 35 including the object is captured at the image capture and transfer rate of the camera 10 (210). FIG. 3-1 schematically shows an example of an original digital image 302 generated from a bitmap image file that is captured of an object 304 in a FOV 300. The FOV 300 is analogous to the FOV 35 described with reference to FIG. 1. The bitmap image file for the original digital image 302 corresponds to the bitmap image file 25 generated with reference to FIG. 1.

Referring again to FIG. 2, the bitmap image file for the original digital image 302 of the FOV 300 including the object 304 is in the form of an 8-bit grayscale image at a standard-definition resolution, e.g., 640×480 pixels, of the FOV 300. As such, the bitmap image file includes an 8-bit datapoint for each of the pixels representing light intensity as measured on a 8-bit grayscale, wherein a datapoint having a base ten numerical value of 0 or binary value of 00000000 represents a minimum light intensity and a datapoint having a base ten numerical value of 255 or a binary value of 11111111 represents a maximum light intensity.

The data in the bitmap image file for the original digital image 302 is analyzed statistically to calculate an average light intensity $\mu$ and a standard deviation $\alpha$ of light intensity for the pixels (212). Preferably, this statistical analysis is executed dynamically, e.g., for every bitmap image file captured by the camera 10. A plurality of new image files is generated based upon the statistical analysis of the light intensity data contained in the bitmap image file for the original digital image 302 including the average light intensity $\mu$ and the standard deviation $\alpha$, with each of the new image files including a portion of the data that is separated based upon magnitude of light intensity (214). This can include generating a quantity of n new images with each of the new images associated with pixels in the bitmap image file for the original digital image 302 that are within a predefined range of light intensity in accordance with the following equation.

$$BIN(k)=\mu+k*(x)*\alpha \quad [1]$$

for k=−n through k=n
wherein k is an integer, and wherein x is a scalar multiplier equal to or less than 1.0, and is calibratable.

This analytical process is employed to generate 2n+1 new digital images by separating the light intensity data in the bitmap image file for the original digital image 302 into a plurality of bins BIN(k) using a histogram process or another suitable data analysis process. As such, the analytical process generates a plurality of one-sided bins. Thus, in an analysis of n=2 for +/−2 standard deviations of light intensity, a first bin BIN(k=−2) can include that portion of the light intensity data in the bitmap image file that includes all pixels having a light intensity that is greater than a threshold of $\mu-2*x*\alpha$, a second bin BIN(k=−1) can include that portion of the bitmap image file that includes all pixels having a light intensity that is greater than a threshold of $\mu-1*x*\alpha$, etc. In each of the new bitmap image files, the pixels in the original digital image 302 that fall outside, i.e., are less than the corresponding threshold, are changed to a value of 0, i.e., blackened. It is appreciated that the scalar multiplier x can be any selectable, calibratable value, and the quantity of new digital images that are created and analyzed is based thereon.

FIGS. 3-2 through 3-6 each shows a new digital image derived from the bitmap image file for the original digital image 302 generated for the object 304 shown with reference to FIG. 3-1, with each of the new images associated with pixels in the bitmap image file for the original digital image 302 that are within a predefined range of light intensity as described with reference to Step 114. By way of example, five images are shown for k=−2, k=−1, k=0, k=1 and k=2.

FIG. 3-2 shows a new digital image 322 that visually displays a first image file that is derived from the bitmap image file for the original digital image 302 generated for the object 304 shown with reference to FIG. 3-1 that includes all pixels having a light intensity that is greater than $\mu-2*x*\alpha$. Extracted line segments 324 derived from this new digital image 322 are superimposed thereon.

FIG. 3-3 shows another new digital image 332 that visually displays a second image file that is derived from the bitmap image file for the original digital image 302 generated for the object 304 shown with reference to FIG. 3-1 that includes all pixels having a light intensity that is greater than $\mu-1*x*\alpha$. Extracted line segments 334 derived from this new digital image 332 are superimposed thereon.

Figures 3, 4:
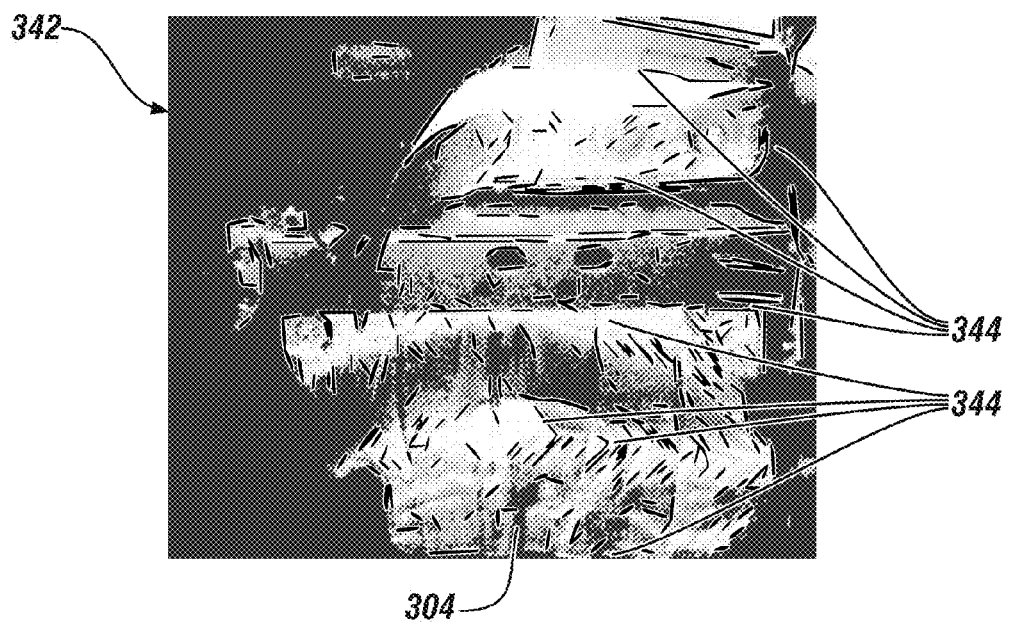

FIG. 3-4 shows another new digital image 342 that visually displays a third image file that is derived from the bitmap image file for the original digital image 302 generated for the object 304 shown with reference to FIG. 3-1 that includes all pixels having a light intensity that is greater than $\mu$. Extracted line segments 344 derived from this new digital image 342 are superimposed thereon.

Figures 3, 4, 5:
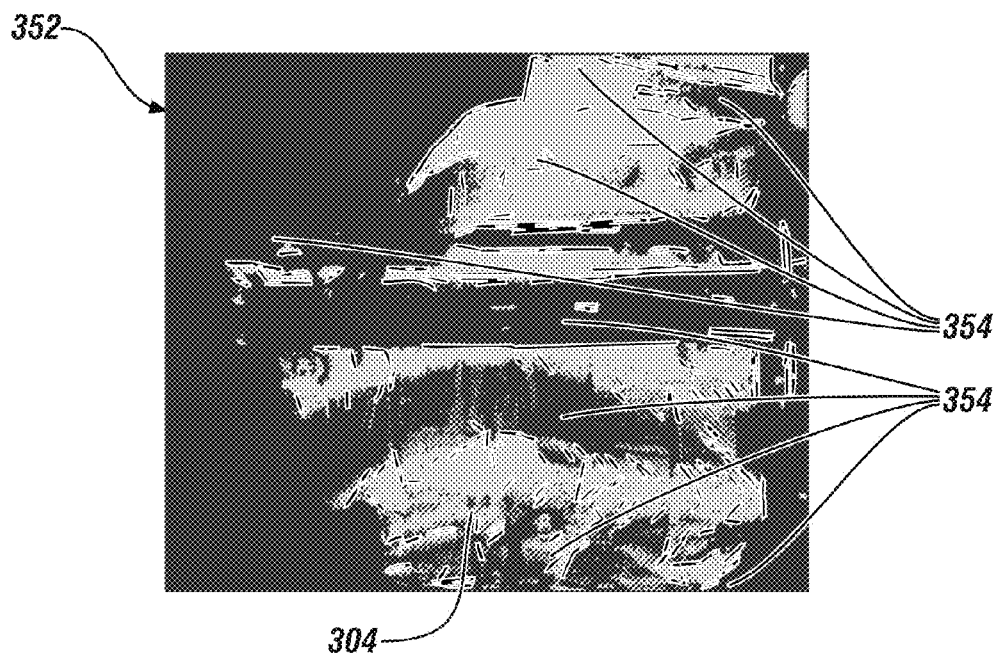
Figures 3, 4, 5, 6:
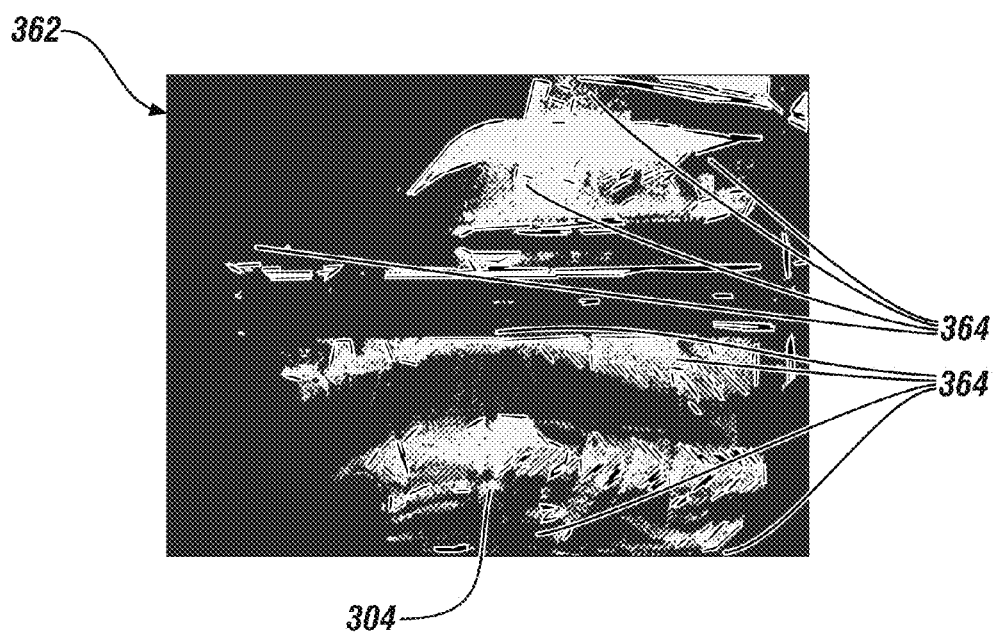
Figures 3, 4, 5, 6, 7:
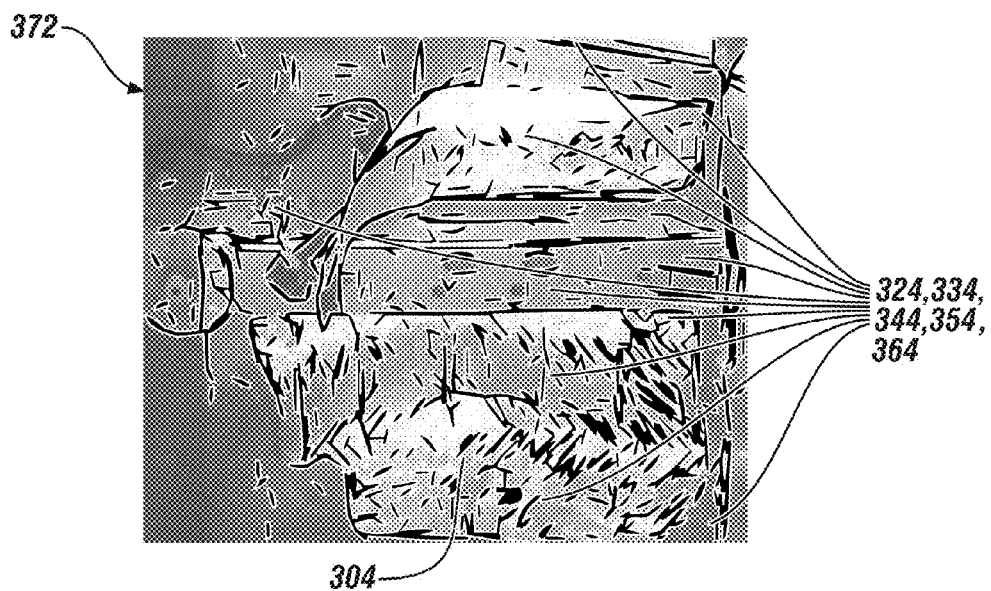
Figure 4:
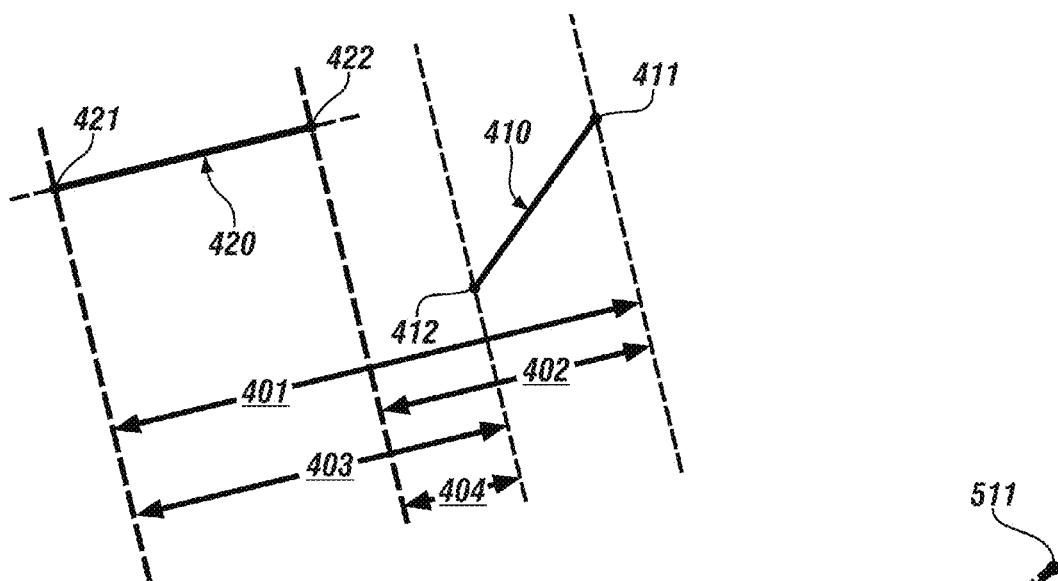
Figure 5:
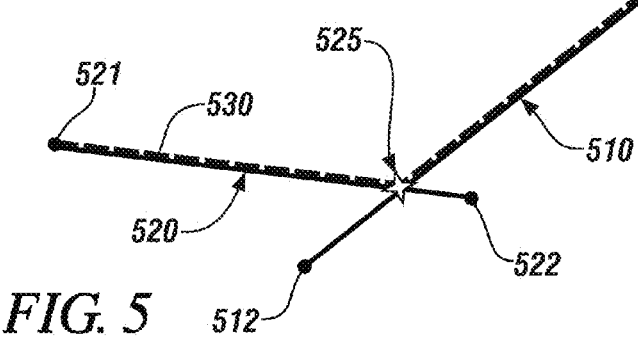

FIG. 3-5 shows another new digital image 352 that visually displays a fourth image file that is derived from the bitmap image file for the original digital image 302 generated for the object 304 shown with reference to FIG. 3-1 that includes all pixels having a light intensity that is greater than $\mu+1*x*\alpha$. Extracted line segments 354 derived from this new digital image 352 are superimposed thereon.

FIG. 3-6 shows another new digital image 362 that visually displays a fifth image file that is derived from the bitmap image file for the original digital image 302 generated for the object 304 shown with reference to FIG. 3-1 that includes all pixels having a light intensity that is greater than $\mu+2*x*\alpha$. Extracted line segments 364 derived from this new digital image 362 are superimposed thereon. The scalar multiplier x associated with a change in light intensity for generating the new image files can be user-defined or automatically set to be one-third standard deviation from the average intensity. In one embodiment, a total of 5 or 7 images are generated with varying light intensity value, which facilitates extraction of a large group of lines useable to identify long boundary lines and short strong features of the object as indicated by the bitmap image file for the original digital image 302.

Referring again to FIG. 2, line segments are extracted from each of the new images (216) using known edge detection techniques. Known edge detection techniques include a gradient-based method such as a Laplacian operator, a Canny edge detector, and a Euclidean distance and vector angle for edge detection in color images. Each line segment is a connected edge from the edge detection step. The extracted line segments represent edges of the object in each of the new images. Due to noisy and different light intensity levels, the start and end positions of each line segment may be slightly different in each of the images. There are many parallel line segments when all images are merged together. Thus, if a line segment is one of the line segments 324 extracted from the image 322 in FIG. 3-2, it is likely that an analogous line segment can be found in a similar position in the line segments 334, 344 and 354 extracted from the images 332, 342 and 352 shown with reference to FIGS. 3-3, 3-4 and 3-5, respectively.

Referring again to FIG. 2, extracted ones of the line segments 324, 334, 344, 354 and 364 derived from the images 322, 332, 342, 352 and 362 shown with reference to FIGS. 3-2 through 3-6 that are overlapping, quasi-parallel, or proximal without intersecting are subjected to merging (218) by combining the identified line segments to generate higher pixel density integral line segments associated with the bitmap image file for the original digital image 302. There may be many parallel line segments when all the images are merged together. For example, if a line segment is identified in image 322, it is likely that analogous line segments can be identified in similar positions in images 332, 342, 352 and 362.

FIG. 4 graphically shows a first line segment $L_1$ 410 and a second line segment $L_2$ 420 for purposes of explaining merging non-intersecting line segments when the line segments are proximal and somewhat parallel. The first line segment $L_1$ 410 is one of the line segments 324 extracted from the image 322 shown with reference to FIG. 3-2 and the second line segment $L_2$ 420 is one of the line segments 334 extracted from the image 332 shown with reference to FIG. 3-3. Line segment $L_1$ has two end points ($P_1$ 411, $P_2$ 412) and line segment $L_2$ 420 is similarly positioned with two end points ($P_3$ 421 $P_4$ 422).

Four Euclidean distance values, $d_1$ 401, $d_2$ 402, $d_3$ 403 and $d_4$ 404 can be calculated between pairs of the two end points ($P_1$ 411, $P_3$ 421), ($P_1$ 411, $P_4$ 422), ($P_2$ 412, $P_3$ 421), ($P_2$ 412, $P_4$ 422), from two line segments $L_1$ 410 and $L_2$ 420 are calculated. A parallel line distance $D_{parallel}$ can be calculated as follows $$D_{parallel} = \frac{1}{2} * (\min(d_1, d_2) + \min(d_3, d_4)) \quad [2]$$

The parallel line distance $D_{parallel}$ is an average distance of two minimum distances of two of the end points. Additionally a minimum value $\min(d_3, d_4)$ can be calculated as previous distance measurement of endpoint $P_2$ 411 of line $L_1$ 410. When two lines $L_1$ 410 and $L_2$ 420 overlap exactly, the parallel line distance $D_{parallel}$ is zero. When the two lines do not overlap each other, the distance is much larger than the overlapped case if they have quiet similar length. That characteristic is readily identified when the two lines are parallel. When the parallel line distance $D_{parallel}$ is less than 10% of the length of the smaller of the two line segments, line segment $L_1$ 410 and line segment $L_2$ 420 are merged to form a single line segment (218). When the parallel line distance $D_{parallel}$ is less than 50% of the length of the smaller of the two line segments, i.e., parallel neighboring line segments, line segment $L_1$ 410 is extended and merged with line segment $L_2$ 420 to form a single line segment. The parallel line merging is done in a recursive manner.

Referring again to FIG. 2, extracted ones of the line segments 324, 334, 344 and 354 derived from the images 322, 332, 342 and 352 shown with reference to FIGS. 3-2 through 3-5 that intersect or overlap are subjected to clustering (220) to generate integral lines for the bitmap image file for the original digital image 302.

FIG. 5 graphically shows a third line segment $L_3$ 510 and a fourth line segment $L_4$ 520 for purposes of explaining clustering of intersecting line segments. The third line segment $L_3$ 510 is one of the line segments 324 extracted from the image 322 shown with reference to FIG. 3-2 and the fourth line segment $L_4$ 520 is one of the line segments 334 extracted from the image 332 shown with reference to FIG. 3-3. Third line segment $L_3$ 510 has two end points ($P_1$ 511, $P_2$ 512) and fourth line segment $L_4$ 520 is similarly positioned with two end points ($P_3$ 521 $P_4$ 522). An intersecting point $P_c$ 525 can be computed for the third line segment $L_3$ 510 and fourth line segment $L_4$ 520, and a new clustered line segment 530 consisting of points $P_1$ 511, $P_c$ 525, $P_3$ 521 can be generated as shown in FIG. 5. The line segment clustering is done in a recursive manner until all intersected lines are clustered, connected, and grouped together. This way, many small line segments that are intersecting will be combined to be long clustered and connected line segments called integral line segments. Integral line segments can be employed in identifying strong feature(s) on the object.

FIG. 3-7 shows digital image 372 including the original digital image 302 generated for the object 304 shown with reference to FIG. 3-1 with the extracted line segments 324, 334, 344, 354 and 364 derived from the images shown with reference to FIGS. 3-2 through 3-6 superimposed thereon. Dense line segments emerge from the superimposed extracted line segments 324, 334, 344, 354 and 364, indicating a boundary for the object and also indicating strong features. Detecting edges in a series of images having varying light intensity levels facilitates edge extraction. The superimposed extracted line segments 324, 334, 344, 354 and 364 have been subjected to merging and clustering.

Referring again to FIG. 2, the integral lines can be exported (222) for use by other control routines and algorithms, including inspection routines. The integral lines may be employed to identify boundaries and strong features on the object, thus detecting the object by delineating its shape and quality. Strong features include those features in the images that are less sensitive to variations in light intensity, i.e., are viewable under varying light conditions. Thus, strong features are those features that are consistently present in a plurality of images of varying light intensity. Strong features can be employed to identify component boundaries, edges and other elements that can be used to locate a component in the FOV and evaluate it. By way of example, identified object features can be employed to identify and distinguish an emblem shape and emblem quality. Integral line segment merging and clustering has shown to be able to overcome technical challenges related to uncertain feature locations, which may be caused by signally noisy images. The merging and clustering results can increase the robustness in the feature recognition without incurring heavy computation time. In one embodiment, the total computation time for processing three images was less than 700 ms. This method will be used in real-time applications to identify strong features and outlines for reliable inspection results.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for inspecting an object in a field of view employing a machine vision system including a digital camera, comprising:
   capturing, via the digital camera, an original digital image including a multiplicity of pixels and associated light intensities for the field of view including the object;
   generating a bitmap image file for the original digital image including the multiplicity of pixels and associated light intensities for the field of view including the object;
   dynamically determining, using a controller, a mean value and a standard deviation of the light intensities of the multiplicity of pixels of the bitmap image file for the original digital image;
   generating a plurality of new image files, each new image file including a portion of the multiplicity of pixels having associated light intensities within a prescribed range of light intensities defined by the mean value and the standard deviation;
   extracting line segments from each of the new image files;
   merging the extracted line segments from the new image files;

clustering the extracted line segments from the new image files; and generating integral lines for the object based upon the merged and clustered extracted line segments from the new image files.

2. The method of claim 1, wherein generating a plurality of new image files, each new image file including a portion of the multiplicity of pixels having associated light intensities within a prescribed range defined by the mean value and standard deviation comprises generating a first new image file including a portion of the pixels of the bitmap image file for the original digital image having light intensities that are greater than the mean value.

3. The method of claim 1, wherein generating a plurality of new image files, each new image file including a portion of the multiplicity of pixels of the bitmap image file for the original digital image having associated light intensities within a prescribed range defined by the mean value and standard deviation comprises generating a second new image file including a portion of the pixels of the bitmap image file for the original digital image having light intensities that are greater than the mean value plus a first value determined based upon the standard deviation.

4. The method of claim 3, wherein generating a plurality of new image files, each new image file including a portion of the multiplicity of pixels of the bitmap image file for the original digital image having a light intensity that is within a prescribed range defined by the mean value and standard deviation comprises generating a third new image file including a portion of the pixels of the bitmap image file for the original digital image having light intensities that are greater than the mean value plus a second value determined based upon the standard deviation.

5. The method of claim 1, wherein extracting line segments from each of the new image files comprises employing edge detection to extract the line segments from each of the new image files.

6. The method of claim 1, wherein merging the extracted line segments from the new image files comprises combining proximal, non-intersecting ones of the extracted line segments from the new image files.

7. The method of claim 1, wherein clustering the extracted line segments from the new image files comprises combining intersecting ones of the extracted line segments from the new image files.

8. The method of claim 1, further comprising delineating a shape of the object in the field of view by identifying boundaries and strong features on the object.

9. The method of claim 8, wherein identifying boundaries and strong features on the object comprises identifying those features that are present in all of the new image files associated with varying light intensities.

10. A method for detecting an object in a field of view employing a digital camera, comprising:

capturing, via the digital camera, a grayscale digital image including a multiplicity of pixels and associated grayscale light intensities for the field of view including the object;

generating a bitmap image file for the original digital image including the multiplicity of pixels and associated grayscale light intensities for the field of view;

dynamically determining, using a controller, a mean value and a standard deviation of the grayscale light intensities of the multiplicity of pixels of the bitmap image file for the original digital image;

generating a plurality of new images, each new image including a portion of the multiplicity of pixels having associated grayscale light intensities within a prescribed range of grayscale light intensities defined by the mean value and the standard deviation;

extracting line segments from each of the new images;

merging the extracted line segments from the new images;

clustering the extracted line segments from the new images;

generating integral lines based upon the merged and clustered extracted line segments from the new images; and identifying boundaries of the object based upon the generated integral lines.

11. The method of claim 10, wherein generating a plurality of new image files, each new image file including a portion of the multiplicity of pixels having associated grayscale light intensities within a prescribed range defined by the mean value and standard deviation comprises generating a first new image file including a portion of the pixels of the bitmap image file for the original digital image having grayscale light intensities that are greater than the mean value.

12. The method of claim 10, wherein generating a plurality of new image files, each new image file including a portion of the multiplicity of pixels of the bitmap image file for the original digital image having associated grayscale light intensities within a prescribed range defined by the mean value and standard deviation comprises generating a second new image file including a portion of the pixels of the bitmap image file for the original digital image having grayscale light intensities that are greater than the mean value plus a first value determined based upon the standard deviation.

13. The method of claim 12, wherein generating a plurality of new image files, each new image file including a portion of the multiplicity of pixels of the bitmap image file for the original digital image having a grayscale light intensity that is within a prescribed range defined by the mean value and standard deviation comprises generating a third new image file including a portion of the pixels of the bitmap image file for the original digital image having grayscale light intensities that are greater than the mean value plus a second value determined based upon the standard deviation.

14. The method of claim 10, wherein extracting line segments from each of the new image files comprises employing edge detection to extract the line segments from each of the new image files.

15. The method of claim 10, wherein merging the extracted line segments from the new image files comprises combining proximal, non-intersecting ones of the extracted line segments from the new image files.

16. The method of claim 10, wherein clustering the extracted line segments from the new image files comprises combining intersecting ones of the extracted line segments from the new image files.

17. The method of claim 10, wherein identifying boundaries of the object based upon the generated integral lines comprises delineating a shape of the object in the field of view based upon the identified boundaries.

18. The method of claim 17, further comprising identifying strong features on the object comprising identifying those features that are present in all of the new image files associated with varying grayscale light intensities.

19. A machine vision system for inspecting an object in a field of view, comprising:

a digital camera; and an analytic controller, wherein the analytical controller executes an image feature identification routine including:

capturing, via the digital camera, an original digital image including a multiplicity of pixels and associated light intensities for the field of view including the object, generating a bitmap image file for the original digital image including the multiplicity of pixels and associated light intensities for the field of view including the object, dynamically determining, using a controller, a mean value and a standard deviation of the light intensities of the multiplicity of pixels of the bitmap image file for the original digital image, generating a plurality of new image files, each new image file including a portion of the multiplicity of pixels having associated light intensities within a prescribed range of light intensities defined by the mean value and the standard deviation, extracting line segments from each of the new image files, merging the extracted line segments from the new image files, clustering the extracted line segments from the new image files, and generating integral lines for the object based upon the merged and clustered extracted line segments from the new image files.

* * * * *